(12) United States Patent
DeGennaro, Jr.

(10) Patent No.: US 7,946,415 B2
(45) Date of Patent: May 24, 2011

(54) CONVERTIBLE TRACK SYSTEM FOR SUPPORT OF CONVEYOR BELTS

(75) Inventor: Ronald J. DeGennaro, Jr., Holbrook, NY (US)

(73) Assignee: Tarpaulin.com, Inc., Woodbury, NY (US)

( * ) Notice: Subject to any disclaimer, the term of this patent is extended or adjusted under 35 U.S.C. 154(b) by 0 days.

(21) Appl. No.: 12/904,287

(22) Filed: Oct. 14, 2010

(65) Prior Publication Data

US 2011/0035919 A1    Feb. 17, 2011

Related U.S. Application Data

(62) Division of application No. 11/641,642, filed on Dec. 18, 2006.

(60) Provisional application No. 60/750,996, filed on Dec. 16, 2005.

(51) Int. Cl.
  *B65G 47/00* (2006.01)
  *B65G 21/00* (2006.01)
(52) U.S. Cl. .................. 198/617; 198/860.1; 198/861.1
(58) Field of Classification Search .................. 198/617, 198/860.1, 861.1, 841
  See application file for complete search history.

(56) References Cited

U.S. PATENT DOCUMENTS

| | | | |
|---|---|---|---|
| 3,826,352 | A | 7/1974 | Van Zon et al. |
| 4,013,167 | A | 3/1977 | Bourgeois |
| 4,325,480 | A | 4/1982 | Butt |
| 4,932,516 | A | 6/1990 | Andersson |
| 5,111,929 | A | 5/1992 | Pierick et al. |
| 5,186,314 | A | 2/1993 | Clopton |
| 5,328,020 | A | 7/1994 | Clopton |
| 5,447,224 | A | 9/1995 | Gebhardt |
| 5,788,056 | A | 8/1998 | Clopton |
| 5,803,687 | A | 9/1998 | Ledingham |
| 6,170,645 | B1 | 1/2001 | Mitchell |
| 6,296,111 | B1 | 10/2001 | Mekanik et al. |
| 6,427,831 | B1 | 8/2002 | Norton |
| 6,523,679 | B1 | 2/2003 | Manchester |
| 6,533,108 | B1 | 3/2003 | Ledingham |
| 6,675,946 | B2 | 1/2004 | Lutz |
| 6,796,418 | B1 | 9/2004 | Harrison et al. |
| 7,128,201 | B2 | 10/2006 | Jones |
| 7,178,665 | B2 | 2/2007 | Ryan |
| 7,624,858 | B2 * | 12/2009 | Delair et al. .................. 198/778 |

* cited by examiner

*Primary Examiner* — Douglas A Hess
(74) *Attorney, Agent, or Firm* — Hoffmann & Baron, LLP

(57) ABSTRACT

A convertible track system for providing additional support to a conveyor belt. The system includes convertible track sections which may be added/removed from the conveyor belt apparatus without disassembly of the existing track supporting structure.

5 Claims, 4 Drawing Sheets

CONVERTIBLE TRACK SYSTEM FOR SUPPORT OF CONVEYOR BELTS

This application is a divisional of U.S. application Ser. No. 11/641,642 filed Dec. 18, 2006, which in turn claims the benefit of U.S. Provisional application Ser. No. 60/750,996 filed Dec. 16, 2005.

BACKGROUND OF INVENTION

The present invention relates to conveyor belts and, more particularly, to a convertible track system for providing additional support to a conveyor belt.

Conveyor belts are used in many industrial applications. These conveyor belts ride upon tracks supported by a frame or other such structure. In turn, the tracks are typically supported by rod/spacer units extending between opposing portions of the frame. These rod/spacer units are positioned at predetermined locations along the path of the conveyor belt.

It will be appreciated by those skilled in the art that the conveyor belt associated with a particular apparatus may occasionally be changed due to reasons such as system repair, system upgrade, and/or system modification. For example, a system could be modified to replace a metal conveyor belt with a plastic conveyor belt. In such a modification, as in other modifications, it may be necessary to provide an additional track under the conveyor belt to ensure adequate support.

In prior art systems, the need to add a track to an existing system involves substantial time and effort. In particular, the known technique for adding an additional support track to an existing system involves disassembling the rod/spacer units from the frame of the system, installing the additional track with new spacers therebetween, reinstalling the rod/spacer units, and re-securing the tracks to the frame. This same process must be repeated if the additional support track needs to be removed from the system.

There is therefore a need in the art for a track system which allows an additional support track to be added/removed to a conveyor belt apparatus without disassembly of the existing track supporting structure.

SUMMARY OF THE INVENTION

The present invention, which addresses the needs of the prior art, relates to a convertible track kit for providing additional support to a conveyor belt. The conveyor belt is supported at its outer edges by a pair of opposing permanent tracks. The permanent tracks have a plurality of spacers extending therebetween at predetermined locations along the length thereof. The kit includes first and second convertible track sections each having opposing ends. Each of the ends is formed with a notch sized to engage one of the spacers. Each of the track sections has a preselected length to allow the track sections to extend between and engage adjacent spacers. The kit further includes hardware for securing adjoining ends of the track sections to one another when the track sections are engaged with the spacers.

The present invention further relates to a method of retrofitting a conveyor belt apparatus to provide an additional track for supporting a conveyor belt. The conveyor belt is supported at its outer edges by a pair of opposing permanent tracks. The permanent tracks have a plurality of spacers extending therebetween at predetermined locations along the length thereof. The method includes the step of providing first and second convertible track sections each having opposing ends. Each of the ends is formed with a notch sized to engage one of the spacers. Each of the track sections has a preselected length substantially corresponding to the length between locations of the spacers. The method includes the further step of positioning the first section to extend between a first spacer and a second spacer. The method includes the further step of engaging the notches of the first track section with an upper portion of the first and second spacers. The method includes the additional step of positioning the second section to extend between the second spacer and a third spacer. The method includes the additional step of engaging the notches of the second track section with an upper portion of the second and third spacers. Finally, the method includes the step of securing one end of the first track section to one end of the second track section in the proximity of the second spacer.

Finally, the present invention relates to a conveyor belt apparatus. The apparatus includes a frame. The apparatus further includes a pair of opposing permanent tracks supported by the frame. The apparatus further includes a conveyor belt supported at its outer edges by the opposing permanent tracks. The apparatus further includes a plurality of spacers extending between the permanent tracks at pre-determined locations along the length thereof. Finally, the apparatus includes first and second convertible track sections each having opposing ends. Each of the ends is formed with a notch sized to engage one of the spacers. Each of the track sections has a preselected length substantially corresponding to the length between the locations of the spacers. The first track section is positioned to extend between a first spacer and a second spacer. The second track section is positioned to extend between a second spacer and a third spacer. Finally, one end of the first track section is secured to one end of the second track section in the proximity of the second spacer.

As a result, the present invention provides a convertible track system and corresponding method which allows an additional support track to be added/removed from a conveyor belt apparatus without disassembly of the existing track supporting structure thereby providing both time and cost savings. The convertible track system of the present invention may be provided as a kit for retrofitting an existing conveyor belt apparatus.

DETAILED DESCRIPTION OF THE INVENTION

Figure 1:
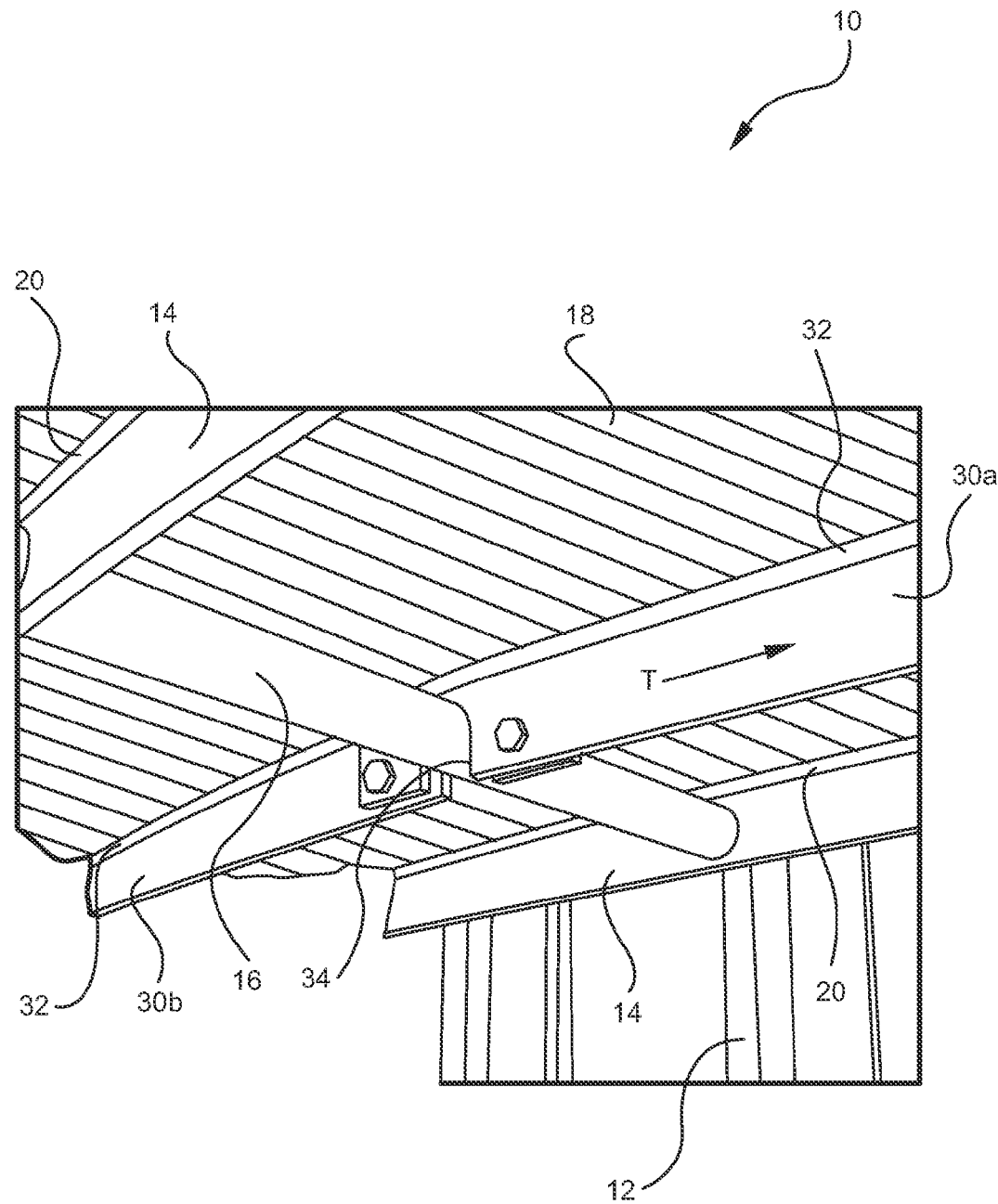
FIG. 1 is a perspective view of a set of tracks, including the convertible track system of the present invention, supporting the underside of a conveyor belt.
Figure 2:
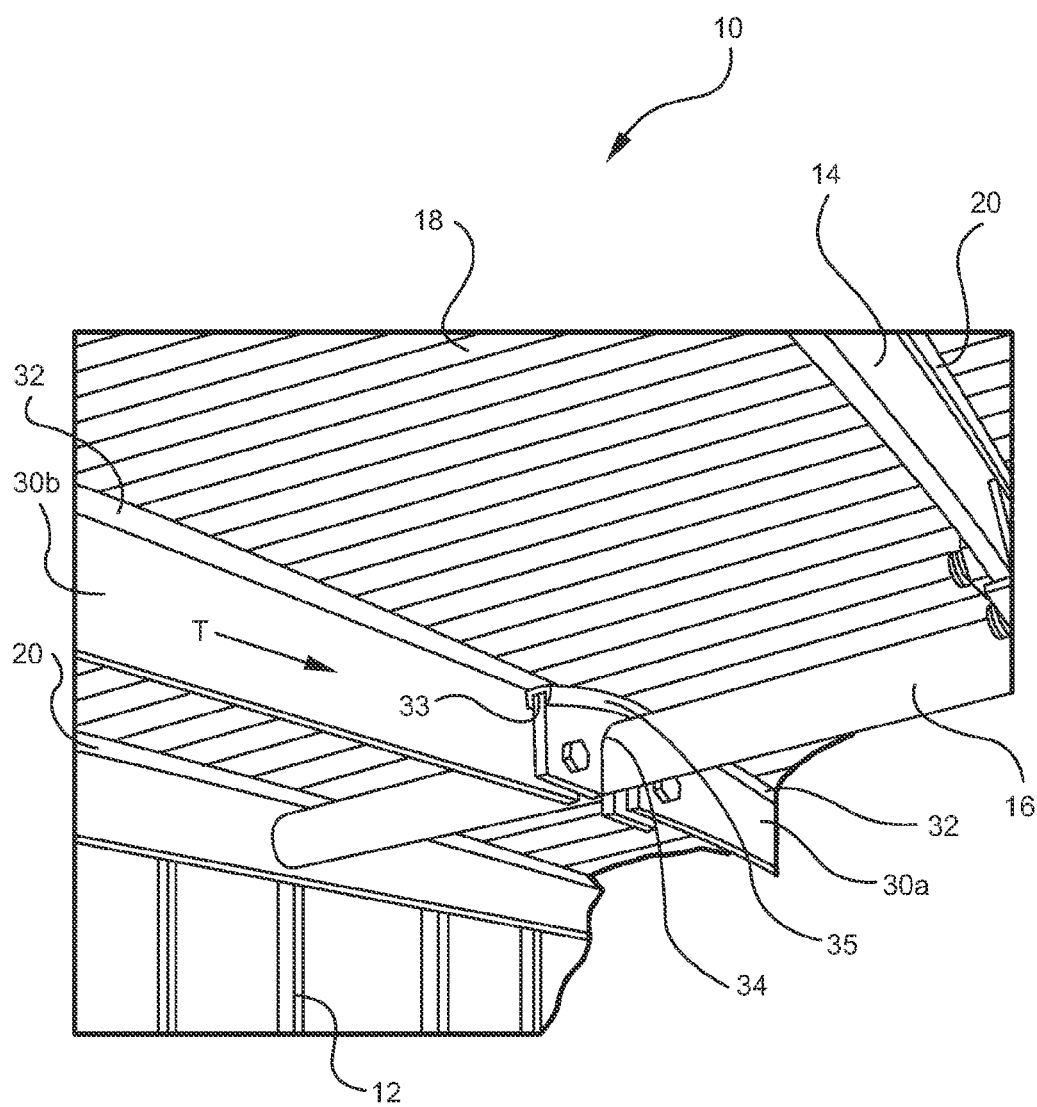
FIG. 2 is another view similar to FIG. 1.

Referring to FIGS. 1 and 2, conveyor belt apparatus 10 includes a frame 12 for supporting a plurality of permanent tracks 14. A plurality of spacers 16 preferably extend between the tracks, while a rod (not shown) extends through the interior of each spacer 16 and through apertures (not shown) formed on permanent tracks 14. In this manner, permanent tracks 14 can be fixed with respect to one another. In addition, the rods extending through permanent tracks 14 can be used to secure such tracks to frame 12.

A conveyor belt 18 rides upon wearstrips 20 secured along an upper edge of permanent tracks 14. However, it will be recognized by those skilled in the art that there are times when an additional support track is desired. Such instances may involve changeover from a metal belt to a plastic belt, or a system modification/upgrade. The present invention provides a system which allows an additional support track to be readily added to an existing conveyor belt apparatus (and thereafter removed if needed) with minimal effort. In particular, the system of the present invention does not require the disassembly of the existing rod/spacer units from the apparatus.

Referring again to FIGS. 1 and 2, convertible track sections 30a, 30b include wearstrips 32 along an upper supporting edge 33 thereof. The ends of the track sections are formed with a generally U-shaped notch 34 sized to receive spacer 16. In particular, the notch includes a curved region 37 which generally corresponds to the outer radius of spacer 16, and is sized and located so that wearstrip 32 is located along the same plane defined by existing wearstrips 20 when notch 34 engages spacer 16. To install the convertible track of the present invention, belt 18 is lifted upward from existing tracks 14 to allow convertible track sections 30, 30a to be installed thereunder. Each track section is sized to extend between adjacent spacers such that the U-shaped notch on each end engages the upper portion of a corresponding spacer. Thus, each spacer will support the leading end of a track section and also the trailing end of the next track section.

As best seen in FIG. 2, upper supporting edge 33 preferably includes a curved portion 35. Those skilled in the art will recognize that such a configuration will allow the conveyor belt to travel along the convertible track sections (in the direction of arrow T) without risk of "jamming" or "catching" on the corners of such track sections. The curved portion thus provides a smooth transition from the wearstrip on one track section to the wearstrip on an adjoining track section.

Figure 3:
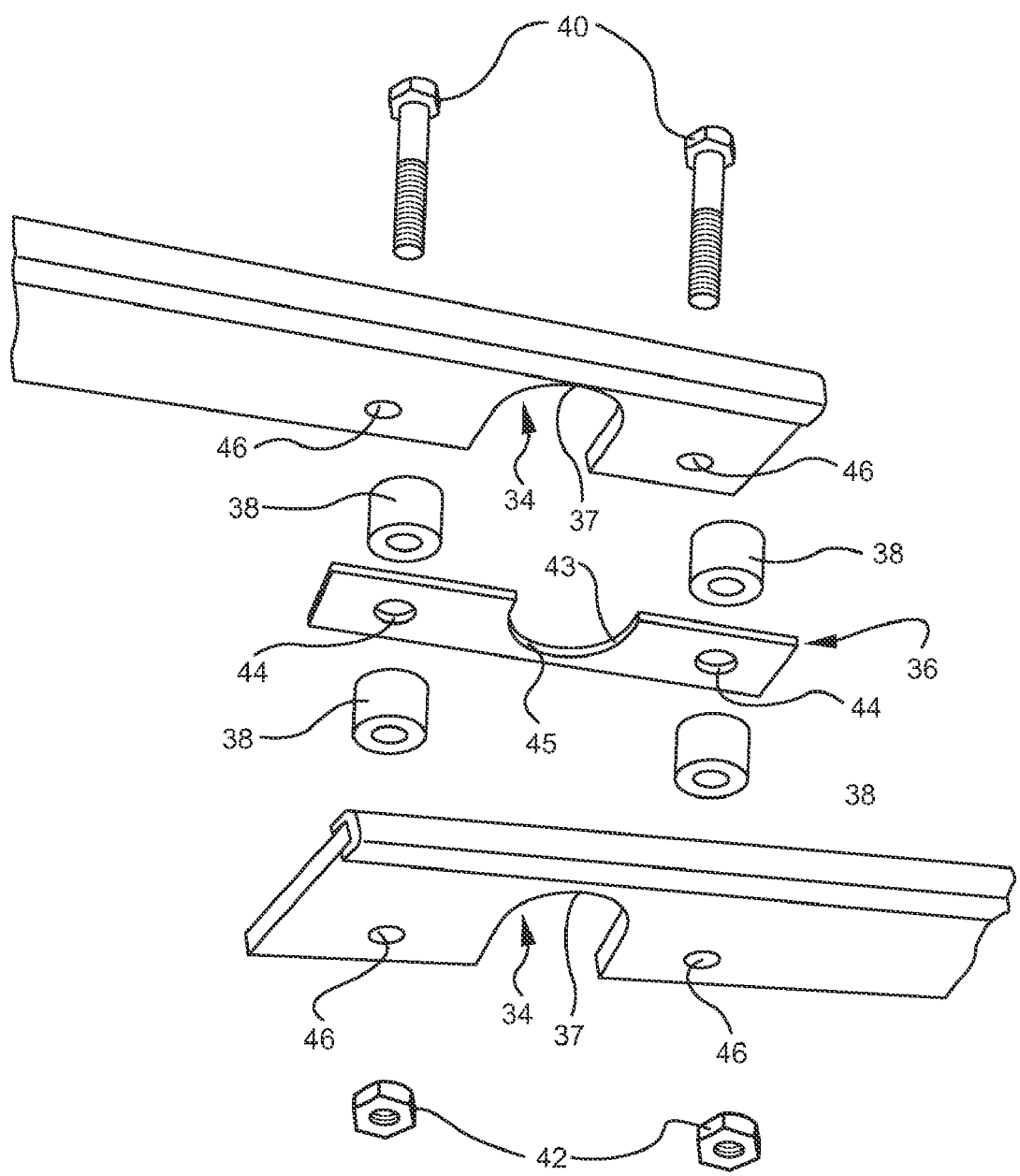
FIG. 3 is an exploded perspective view of the components for securing the ends of the convertible track sections.
Figure 4:
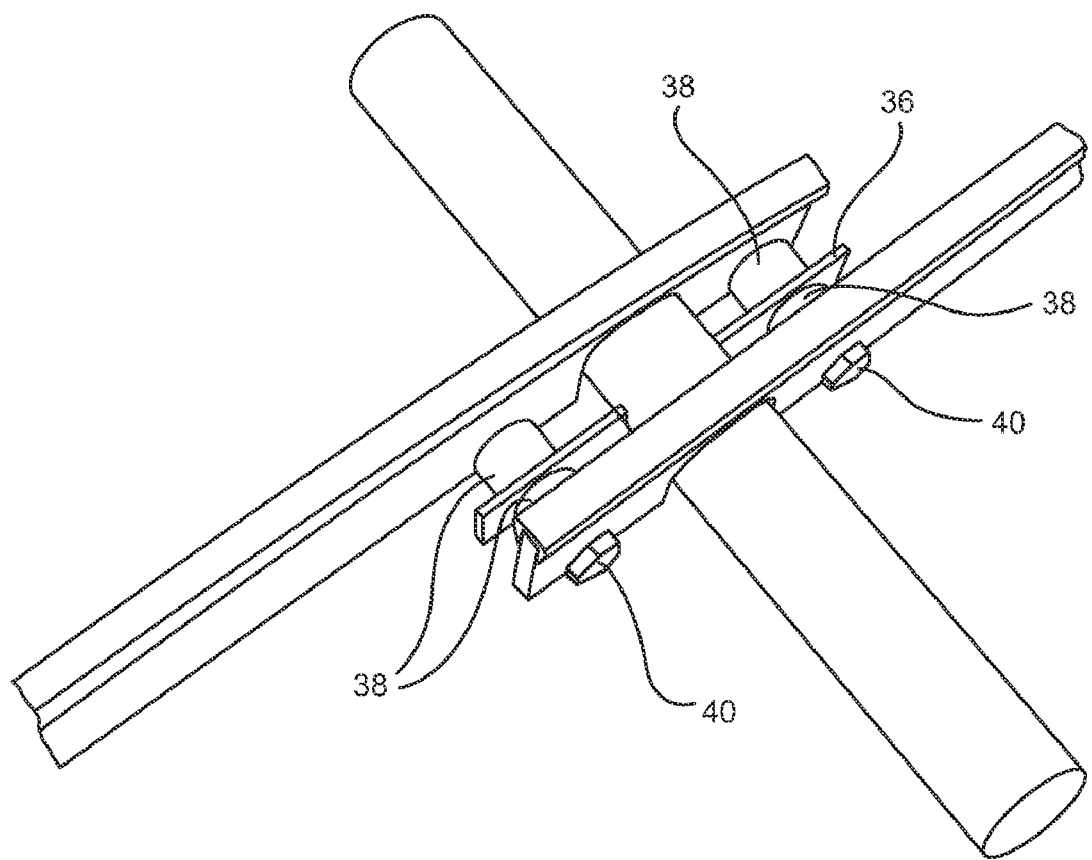
FIG. 4 is a perspective view showing the convertible track sections in an assembled state apart from the conveyor belt.

Referring now to FIG. 3, the system of the present invention further includes a track joint 36, a plurality of collars 38, bolts 40 and nuts 42. Track joint 36 includes a notch 43 having a curved region 45 which generally corresponds to the outer radius of spacer 16. Track joint 36 further includes fastener apertures 44, while each of the track sections includes fastener apertures 46. After track sections 30a, 30b are positioned on spacer 16, track joint 36 and collars 38 are located therebetween. Track joint 36 is preferably installed from the underside of spacer 16. Bolts 40 are then installed through existing apertures in the various components to allow installation of nuts 42, thereby securing one end of track section 30a to one end of track section 30b, and also locking the track sections to the spacer. FIG. 4 is a detail of the assembled components removed from the conveyor belt apparatus.

The individual track sections are preferably sized to extend between existing spacers on the conveyor belt apparatus. In this regard, both ends of each track section include a U-shaped notch for engagement with spacers 16. These track sections can be easily installed on an existing apparatus, even without removal of the conveyor belt. Thus, the system of the present invention allows an additional support track to be added/removed from an existing conveyor belt apparatus with substantially less effort than known prior art techniques.

While various embodiments of the present invention are specifically illustrated and/or described herein, it will be appreciated that modifications and variations of the present invention may be effected by those skilled in the art without departing from the spirit and intended scope of the invention.

What is claimed is:

1. A method of retrofitting a conveyor belt apparatus to provide an additional track for supporting a conveyor belt, said conveyor belt being supported at its outer edges by a pair of opposing permanent tracks, said permanent tracks having a plurality of spacers extending therebetween at predetermined locations along the length thereof, comprising:

providing first and second convertible track sections each having opposing ends, each of said ends being formed with a notch sized to engage one of said spacers, each of said track sections having a preselected length substantially corresponding to the length between locations of said spacers;

positioning said first section to extend between a first spacer and a second spacer;

engaging said notches of said first track section with an upper portion of said first and second spacers;

positioning said second section to extend between said second spacer and a third spacer;

engaging said notches of said second track section with an upper portion of said second and third spacers; and securing one end of said first track section to one end of said second track section in the proximity of said second spacer.

2. The method according to claim 1, further comprising the steps of:

providing a track joint including a notch sized to engage one of said spacers; and locating said track joint between said ends of said first and second track sections and positioning said track joint to engage a lower portion of said second spacer.

3. The method according to claim 2, further comprising the step of providing a plurality of bolts; and wherein each of said ends and said track joint include a plurality of fastener apertures, and wherein said securing step includes the further step of installing said bolts through said apertures in said ends of said first and second track sections and said apertures in said track joint positioned therebetween whereby said track sections are secured to said spacer.

4. The method according to claim 3, further providing the step of providing a plurality of collars sized to allow passage of said bolts therethrough; and wherein said securing step includes the further step of positioning said collars between said ends of said first and second track sections, and wherein said securing step includes the further step of installing said bolts through said collars to secure the ends of said first and second track sections at a preselected distance thereapart.

5. The method according to claim 4, wherein said positioning steps are accomplished without removal of said conveyor belt.

* * * * *